Aug. 8, 1944. H. F. KHOENLE 2,355,445

FISHING REEL

Filed June 28, 1941

INVENTOR
HERMAN F. KHOENLE

ATTORNEYS

Patented Aug. 8, 1944

2,355,445

UNITED STATES PATENT OFFICE 2,355,445

FISHING REEL

Herman F. Khoenle, Akron, Ohio, assignor to The Enterprise Manufacturing Company, Akron, Ohio, a corporation of Ohio Application June 28, 1941, Serial No. 400,215

14 Claims. (Cl. 242—84.5)

The present invention relates to fishing reels and more particularly to that type of reel in which movement is imparted to the spool and other mechanism through a main driving gear which meshes with the spool pinion and also with the level-wind mechanism, if used on the reel.

In reels of this type as they have been universally constructed, the main or drive gear is rotated on a post which projects from the front plate of the reel into a sleeve on the gear casing. The gear is provided with a shank which extends through the gear casing or cap and on which is secured the crank. There is always a certain amount of longitudinal movement or end play permitted in order that the gear may run freely. This permits the gear to run with its side in contact with the inner surface of the cap, which is objectionable as the metal of the cap will abrade the gear. End play also wears out the mechanism rapidly and contributes to jerky operation of the crank which is not desirable in fishing.

The present invention has as its object the designing of means to prevent end play of the gear with all of its attendant disadvantages. It is also designed to prevent the face of the gear from wearing against the inner face of the cap. The increase in the life of the reel, smoothness of operation and other beneficial results follow the invention.

In the drawing and description are disclosed two forms for securing the benefits referred to. Primarily the invention consists in the provision of an adjustable member, preferably in the form of a bearing ring, which may be brought against the side of the gear to hold it against the base of the post upon which it is mounted. This prevents the objectionable end play, and as the cog post and the adjustable ring are made of stainless steel and the gear is bronze, the wear on the gear is reduced to a minimum. Means are also provided to hold the adjustable bearing member in position so that it will not easily get out of adjustment.

Other means may be provided to secure the results set forth and it should be understood that changes and modifications or equivalent constructions and designs are intended to be covered, because, so far as is known, no reel constructions have provided for adjustable compensation to take up the end play of the driving gear upon the cog post. The device is accessible from the exterior of the reel so that the fisherman can readily make the requisite adjustments.

Two forms or embodiments of the invention are shown as being the best known or preferred forms of the invention, and they will now be described in detail without intending to limit the invention to those particular forms.

Figure 1:
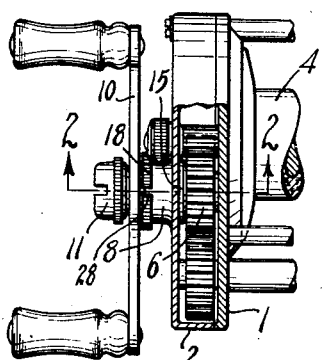
Fig. 1 is a fragmentary side view of the front or crank end of a reel of standard construction to which the first form of the invention is applied.
Figure 2:
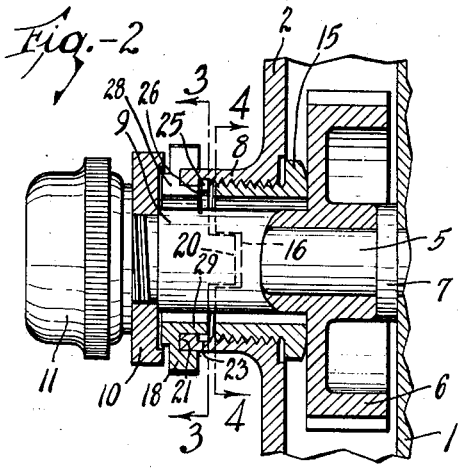
Fig. 2 is an enlarged cross-section on the line 2—2 of Fig. 1.
Figure 3:
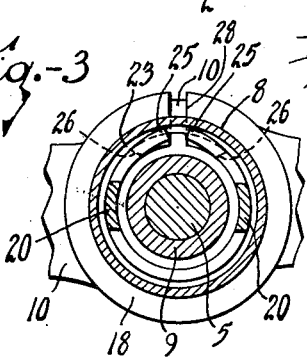
Fig. 3 is a section on the line 3—3 of Fig. 2.
Figure 4:
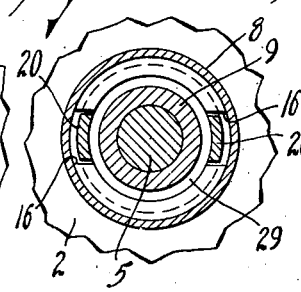
Fig. 4 is a section on the line 4—4 of Fig. 2.
Figure 5:
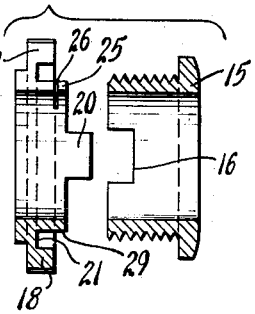
Fig. 5 is a composite view showing the two adjusting elements spread apart.

In the drawing of both forms, 1 represents the front plate of the reel upon which is mounted the cap or gear casing 2 in which the gearing to drive the spool 4 and the level-wind mechanism is housed. From the end plate extends the cog post 5 upon which the main driving gear 6 is rotatable. The cog post has an enlarged base 7 and extends outwardly centrally of a sleeve or casing 8 formed on the cap 2. The gear 6 is provided with an extended shank 9 to which the crank 10 is attached, being held in position by a nut 11. So far, the construction is usual and it will be seen that in such a construction considerable end play of the gear on the post is permitted, and that in such constructions the outer face of the gear will wear against the interior of the cap.

In the form of the invention shown in Figs. 1 to 5 incl., the interior of the sleeve 8 is threaded and engaged with the threads is the adjustable bearing member or ring 15, the inner face of which can be moved toward and from the outer face of the gear 6 by rotating the bearing member in its seat. By moving the member 15 inwardly, the gear 6 is held in position against end play between the inner face of the member 15 and the enlarged base 7 of the cog post which acts as an abutment to limit endwise movement of the gear in one direction. It is possible, therefore, to adjust the parts so that the very minimum of clearance is provided between the elements 15 and 7. As both the post and the bearing member are made of stainless steel, the wear on the gear is also reduced to the minimum.

It is possible to adjust this bearing member from the interior of the cap, but as this would involve removal of the cap and as it is desirable to adjust the bearing member 15 from the exterior of the reel, there is provided an attachment by which this may be done. For this purpose the outer end of the adjustable bearing member is provided with two recesses or notches 16 and in the outer end of the sleeve 8 is located the operating ring 18, the inner face of which is formed with teeth 20 which engage in the notches 16 so that the part 15 may be rotated. The operating ring 18 is provided with a groove 21 to receive the end of the sleeve and lies between the sleeve and the crank. To prevent displacement of the ring 18, the interior wall of the sleeve is formed with a groove 23 in which are received the two prongs or fingers 25 by which the ring is locked against displacement. To form the fingers the stock of the ring is cut by a circular saw forming the slot 26 and then by a longitudinal cut 28 intersecting the slot 26, so that when the ring is in place the fingers 25 may be bent outwardly to enter the channel 23. The outer circumference of the shank 29 of ring 18 is slightly greater than the inner circumference of the sleeve 8 and as the ring is made of a spring metal, the pressure exerted by the ring prevents accidental movement of the ring and the spring fingers serve to keep the ring in position on the end of the sleeve.

The outer surface of the ring 18 is knurled so that the fisherman may easily manipulate it.

Figure 6:
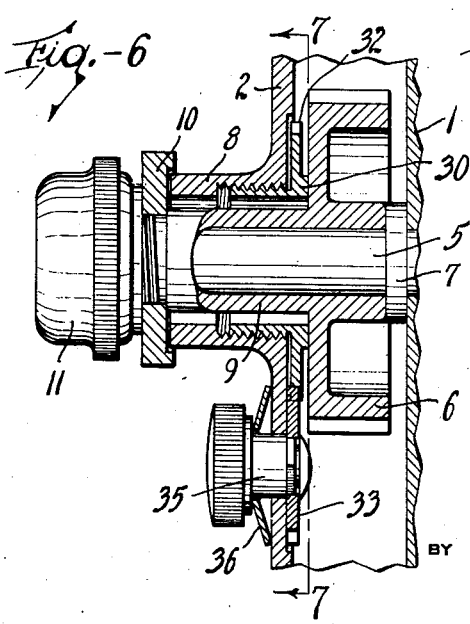
Fig. 6 is an enlarged cross-section of the second form of the invention.
Figure 7:
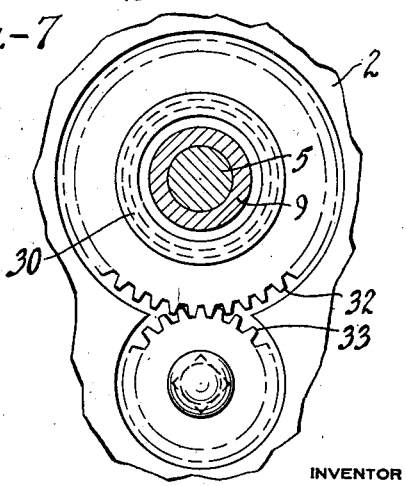
Fig. 7 is a section on the line 7—7 of Fig. 6.

In the form of the invention shown in Figs. 6 and 7, the bearing ring, which is in screw-threaded engagement with the sleeve 8, is designated as 30. At its inner end the ring is provided with geared toothed flange 32 which engages an operating pinion 33 rotated by a stud 35 mounted in the gear casing. A concave spring washer 36 located beneath the head of the stud 35 and the gear casing imparts the resistance to creeping which is desirable in the combination.

In both forms of the invention, the end play of the main driving gear is taken up by decreasing the distance between the base 7 of the cog post and the bearing member 15 or 30. This not only prevents any jerkiness in operation, but also causes the face of the gear 6 to be kept away from the interior of the gear casing. It is also possible to employ the adjustment to create a drag on the reel.

What is claimed is:

1. In a fishing reel comprising an end plate and a gear casing thereon, a post on the end plate, a driving gear rotatable upon the post and a ring-shaped bearing member having screw-threaded engagement with the gear casing and adjustable toward and from the face of the gear.

2. In a fishing reel comprising an end plate and a gear casing thereon, a post on the end plate, a driving gear rotatable upon the post, a ring-shaped bearing member having screw-threaded engagement with the gear casing and adjustable toward and from the face of the gear, and means accessible from the exterior of the reel to adjust the bearing member.

3. In a fishing reel comprising an end plate and a gear casing thereon, a post on the end plate, a driving gear rotatable upon the post, a ring-shaped bearing member having screw-threaded engagement with the gear casing and adjustable toward and from the face of the gear, and friction means to restrain such movement of the bearing member.

4. In a fishing reel the combination of an end plate, a gear casing on the end plate, a sleeve on the gear casing, a post on the end plate, a driving gear on the post, a bearing ring having screw-threaded engagement with the sleeve, and means to rotate the bearing member to move its inner end toward and from the face of the gear.

5. In a fishing reel the combination of an end plate, a gear casing on the end plate, a sleeve on the gear casing, a post on the end plate, a driving gear on the post, a ring bearing against one side of the gear and having screw-threaded engagement with the sleeve, and an operating ring on the end of the sleeve having connections with the bearing ring.

6. In a fishing reel the combination of an end plate, a gear casing on the end plate, a sleeve on the gear casing, a post on the end plate, a driving gear on the post, a ring bearing against one side of the gear and having screw-threaded engagement with the sleeve, and means located on the exterior of the gear casing to rotate the bearing ring.

7. In a fishing reel the combination of an end plate, a gear casing on the end plate, a sleeve on the gear casing, a post on the end plate, a driving gear on the post, a ring bearing against one side of the gear and having screw-threaded engagement with the sleeve, an operating ring on the end of the sleeve having connections with the bearing ring, and spring means to restrain rotation of the operating ring.

8. In a fishing reel the combination of an end plate, a gear casing on the end plate, a sleeve on the gear casing, a post on the end plate, a driving gear on the post, a ring bearing against one side of the gear and having screw-threaded engagement with the sleeve, means located on the exterior of the gear casing to rotate the bearing ring, and spring means to restrain rotation of the bearing ring.

9. In a fishing reel the combination of an end plate, a gear casing on the end plate, a post on the end plate, a gear rotatable and axially movable on the post, an adjustable screw-threaded bearing member movable toward and from the face of the gear to limit its axial movement on the post, and means accessible from the exterior of the reel to rotate the bearing member.

10. In a fishing reel the combination of an end plate, a gear casing thereon, a post on the end plate, a driving gear rotatable on the post, a bearing member in screw-threaded engagement with the gear casing and movable toward and away from a lateral face of the gear, and an operating member located at the side of the bearing member and in driving engagement therewith.

11. In a fishing reel the combination of an end plate, a gear casing thereon, a post on the end plate, a driving gear rotatable on the post, a ring-shaped member bearing against one side of the gear and in screw-threaded engagement with the gear casing, and a rotatable operating device interengaged with the bearing member.

12. In a fishing reel the combination of an end plate, a gear casing thereon, a post on the end plate, a driving gear rotatable on the post, a ring-shaped member bearing against one side of the gear and in screw-threaded engagement with the gear casing, and a rotatable operating device mounted in the gear casing and interengaged with the bearing member.

13. In a fishing reel the combination of an end plate, a gear casing thereon, a post on the end plate, a driving gear rotatable on the post, a ring-shaped member bearing against one side of the gear and in screw-threaded engagement with the gear casing, a rotatable operating device mounted in the gear casing and interengaged with the bearing member, and spring means to restrain the movement of the operating device.

14. In a fishing reel having a front plate, a gear casing on the front plate and spaced therefrom to form a chamber, a post attached to the front plate, said post having an enlarged base, a driving gear located in the chamber, said gear being rotatable and slidable axially on said post, a sleeve on the gear projecting through the casing, a crank attached to the projecting end of the sleeve, the inner side of said gear bearing against the base of the post, and means to limit the extent of axial movement of the gear on the post without retarding its free rotation thereon, comprising a bearing member fixed in the casing and having a portion thereof located between the inner face of the casing and the outer face of the gear and means accessible from the exterior of the reel to adjust the fixed position of said bearing member on the casing to vary the space in which the gear rotates between the bearing member and the base of the post.

HERMAN F. KHOENLE.